(12) United States Patent
Aufranc et al.

(10) Patent No.: US 7,936,361 B2
(45) Date of Patent: May 3, 2011

(54) SYSTEM AND METHOD FOR MASKING AND OVERLAYING IMAGES IN MULTIPLE PROJECTOR SYSTEM

(75) Inventors: Richard Aufranc, Albany, OR (US); Thomas M Carrico, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 875 days.

(21) Appl. No.: 11/799,279

(22) Filed: Apr. 30, 2007

(65) Prior Publication Data

US 2008/0266321 A1  Oct. 30, 2008

(51) Int. Cl.
*G09G 5/00* (2006.01)

(52) U.S. Cl. ...................................................... 345/640

(58) Field of Classification Search .................. 345/626, 345/634, 635, 639, 640, 641; 348/750; 353/30, 353/94
See application file for complete search history.

(56) References Cited

U.S. PATENT DOCUMENTS

| | | | |
|---|---|---|---|
| 1,806,452 A * | 5/1931 | Fulgora | 353/30 |
| 5,077,154 A * | 12/1991 | Corley | 353/30 |
| 6,456,339 B1 | 9/2002 | Surati et al. | |
| 6,481,849 B2 | 11/2002 | Martin et al. | |
| 6,545,685 B1 * | 4/2003 | Dorbie | 345/582 |
| 6,568,816 B2 | 5/2003 | Mayer, III et al. | |
| 6,783,252 B1 * | 8/2004 | Cambron | 353/30 |
| 6,903,741 B2 | 6/2005 | Corbetta | |
| 7,097,311 B2 | 8/2006 | Jaynes et al. | |
| 2002/0057361 A1 | 5/2002 | Mayer, III et al. | |
| 2002/0158877 A1 | 10/2002 | Guckenberger et al. | |
| 2002/0180727 A1 * | 12/2002 | Guckenberger et al. | 345/418 |
| 2003/0227599 A1 | 12/2003 | Weissman et al. | |
| 2005/0287449 A1 | 12/2005 | Matthys et al. | |
| 2006/0144763 A1 | 7/2006 | Coffelt et al. | |
| 2006/0146295 A1 | 7/2006 | Harboe | |
| 2007/0002047 A1 | 1/2007 | Desgranges et al. | |

* cited by examiner

*Primary Examiner* — Jeffery A Brier

(57) ABSTRACT

A system and method for masking images in a multi-projector system, including: converting, using signal processors associated with at least two projectors, at least two independent input video signals into at least two independent signals for masked images, each masked image having an image region and a region of attenuated brightness comprising a mask having substantially no brightness, wherein a mask of one masked image interfaces in a composite image with an image region of another masked image; independently projecting the at least two masked images via the at least two projectors to a common location to form the composite image, such that the at least two masked images are at least partially superimposed; and gradually attenuating brightness in a spatial manner adjacent to a boundary of a mask of at least one of the masked images.

17 Claims, 6 Drawing Sheets

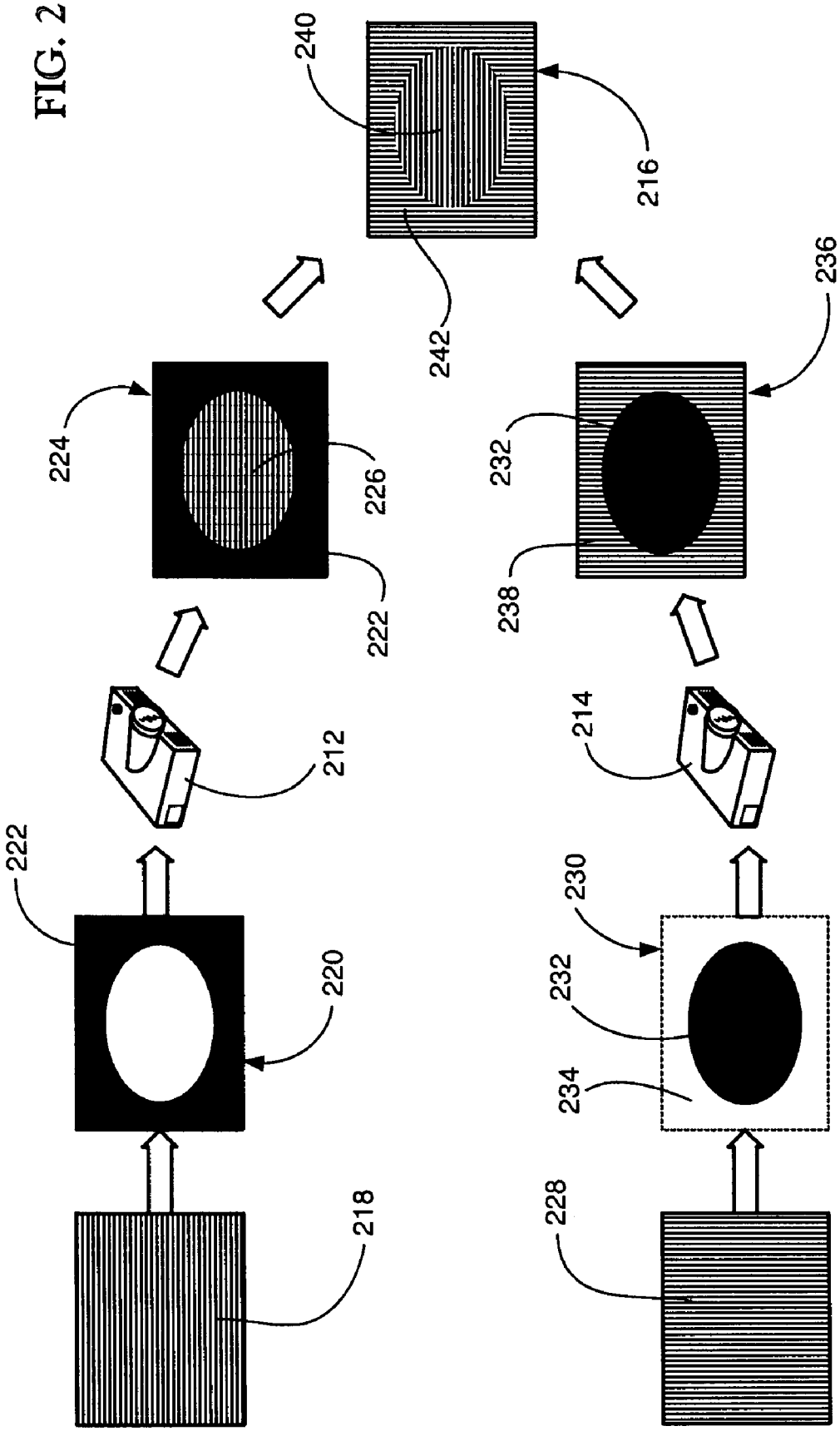

SYSTEM AND METHOD FOR MASKING AND OVERLAYING IMAGES IN MULTIPLE PROJECTOR SYSTEM

BACKGROUND

This disclosure relates generally to projection systems, especially multiple projector systems that project multiple video images to a common display location, such as a screen or wall. These systems can be configured to allow multiple component images to overlap completely, not at all, or anything in between. For example, the multiple component images can overlap completely to produce a single composite image (e.g. to provide greater luminance, resolution, etc.), or the component images can be tiled together, edge-to-edge, with little or no overlap, to produce a composite image made up of several discrete component images.

There are a variety of methods that allow multiple video images to be blended in a single video display, but most of these involve video processing that is performed at the origin of the video signal, rather than at the projection end. One common method for producing composite images and creating the appropriate masks is chroma key (aka "bluescreen" or "greenscreen") processing. Chroma key processing produces a single composite image in which a real object appears to be positioned in front of a virtual background image that has been segmented into the video signal. Perhaps the most well known example of the use of chroma key systems is that of a television weatherman standing in front of a computer-generated weather map, explaining the weather.

In a chroma key system the mask for combining multiple video images is created at the image source—i.e. by the image processors associated with the cameras or other systems that create the individual component images. However, in a multiple projection system it can be desirable to send multiple individual video signals to separate projector systems that are configured to mask and blend the multiple images into a single display at the projection end.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein:

FIG. 2 is a conceptual diagram showing one embodiment of a system and method for masking and overlaying images in a multiple projector system;

DETAILED DESCRIPTION

Figure 1A:
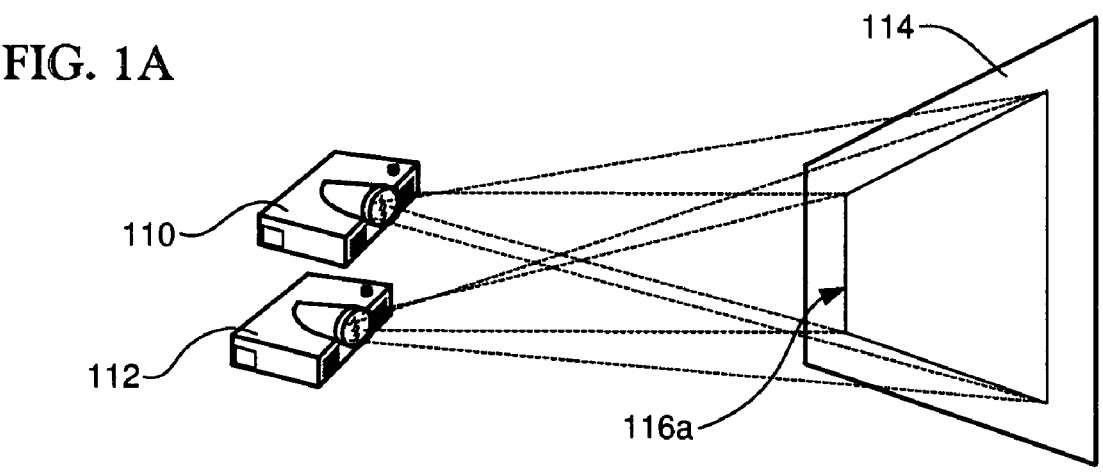
FIGS. 1A-1C are perspective views of a multiple projector system having two projectors projecting images to a common projection location, with full overlap, partial overlap, and no overlap of the component images, respectively.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

A chroma key system is one example of a system in which a mask for combining multiple video images is created at the image source—i.e. by the image processors associated with the cameras or other systems that create the individual component images. In a multiple projection system, however, it can be desirable to send multiple individual video signals to separate projectors that allow multiple images to be blended into a single display at the projection end.

The system and method disclosed herein creates a mask for each projector of a multiple projector system in the projector pipeline using the signal processors associated with each projector, and uses two or more projectors to blend the images at the projection end. Advantageously, the system retains all of the potential advantages of a multiple projector display system (i.e. display redundancy, high illuminance, etc), and also allows a user to create controllable, variably-shaped and irregular boundaries for the displayed image from each projector. This can allow the use of a wide variety of geometric outlines for each video stream, such as corporate logos, and irregular shapes. The method also allows the final projected image to be non-rectangular if desired, but with all of the advantages of a multiple projector system.

Figure 1B:
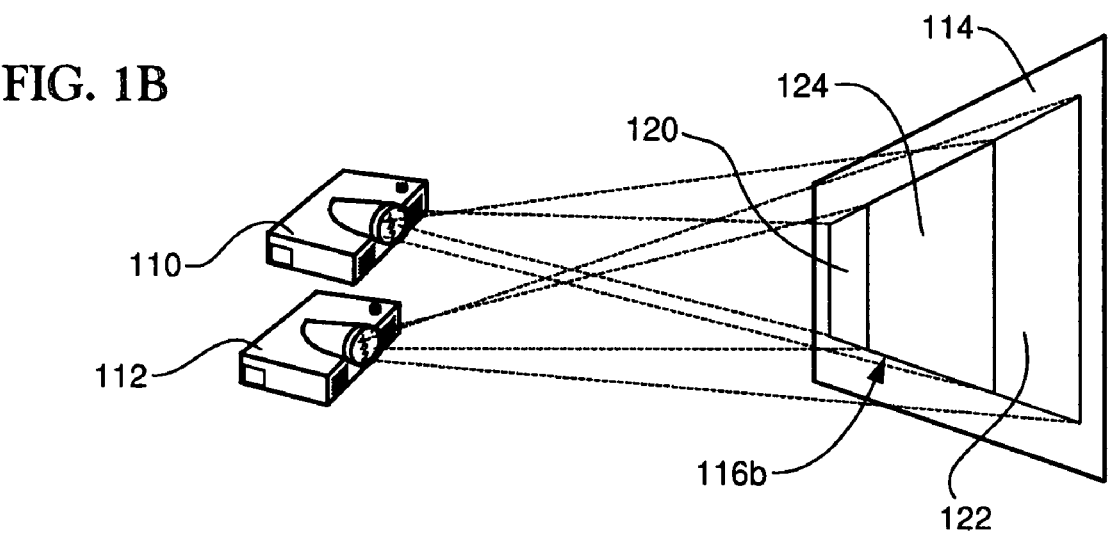
Figure 1C:
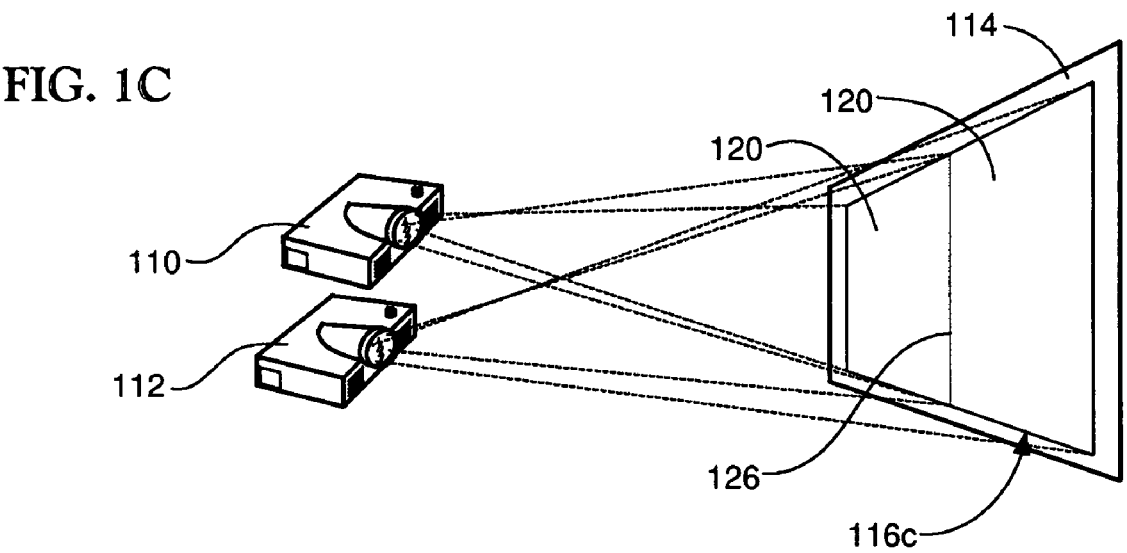

A two-projector system is depicted in each of FIGS. 1A-1C. The two projectors 110, 112 are oriented toward a common projection location 114, which can be a projection screen, a wall, or any other desired projection surface. The final projected image is represented by an outline generally denoted 116. An image projected from a single projector is referred to herein as a component image, and the combination of all images from multiple projectors in a multiple projector system is referred to as a composite image.

As used herein, the term "overlay" is intended to be synonymous with "superimpose", and refers to projected images that are projected to a common location and overlap each other to some degree. Multiple projector systems can be configured so that the images from each projector completely overlap, have partial overlap, or are tiled together, with little or no overlap between the respective images from each projector. For example, as shown in FIG. 1A, the composite image 116a comprises the component images from each of projectors 110 and 112 projected so as to completely overlap. This configuration can be desirable to provide increased brightness of the composite image, as well as to provide image redundancy. That is, with both projectors providing the same image to the same location, the projection location of each pixel from one projector is also covered by a corresponding pixel from the other projector. Consequently, if one pixel projected from one projector is defective, the same pixel projected from another projector will still appear at that location.

As an alternative to the full overlap condition, the projectors 110, 112 can be aimed so that there is partial overlap of the respective component images. This condition is shown in FIG. 1B. In this configuration, the component image 120 from projector 110 is projected toward one side of the projection surface 114, while the component image 122 from the projector 112 is projected toward the other side of the projection surface, with an overlap area 124 in the middle where both component images are combined. This type of configuration can be used to produce a composite image 116b having a different aspect ratio than either of the component images, for example. Because the overlapped area receives an image from both projectors, the advantages of substantially seamless tiling and increased pixels are provided. Edge blending routines can be applied to reduce the brightness of each component image in the overlap area to provide uniform brightness across the entire display.

Another alternative, shown in FIG. 1C, tiles the component images 120, 122 together at the edges to produce a tiled display 116c. In this type of display there is little or no overlap of the component images, but instead a boundary line 126 where the images meet. At the boundary line there can be a small amount of edge blending (e.g. over an area a few pixels wide) between the two images to reduce the appearance of a boundary or line. A tiled display does not provide increased brightness or image redundancy except in the relatively small areas of overlap, but allows a larger overall composite image. It is to be understood that while two projectors are shown in the examples of FIGS. 1A-1C, any number of projectors can be used in a multiple projector system. Moreover, the position of the component images can vary in both the horizontal and vertical dimensions, and the overlap condition of the various component images can be static or dynamically changing over time in a variety of ways.

Masking and overlaying video images in accordance with the present disclosure can be done in any of the multiple projector system configurations shown in FIG. 1. One embodiment of a process for masking and overlaying video images in a multiple projector system is illustrated in FIG. 2. For simplicity, this figure represents a two-projector system, though it is to be understood that the system and method disclosed herein also applies to systems having more than two projectors. The two projectors, 212, 214, are both oriented toward a common projection location, such as a screen, a wall, etc., and in this embodiment are configured to project their respective component images to a full overlap position, like that shown in FIG. 1A.

In the system shown in FIG. 2, the first projector 212 receives a first video image 218. This can be any type of video image from any type of video source (e.g. a video camera, a video playback device, a computer graphics system, etc.). In FIG. 2, the first video image is represented as a series of horizontal stripes, though it is to be appreciated that the system and method disclosed herein can apply to any kind of image. Before projection by the first projector, however, the signal of the first video image is processed by a signal processor associated with the projector to provide a mask. As shown in FIG. 2, a first mask 220 is imposed upon the first video image that at lest partially blocks or turns off an outer portion of the image producing a region 222 of attenuated brightness, while an inner portion of the image is left substantially unchanged. The region 222 can be referred to as a "dark" region. As used herein the term "dark region" is not intended to imply a region that is necessarily completely dark, but that its brightness is attenuated to some degree. As discussed below, the brightness attenuation can be varied for desired effects.

With the first mask 220 imposed upon the first video image 218, the first projector 212 projects a first masked image 224, comprising the dark region 222 created by the first mask, and an inner image region 226 that is not blocked by the first mask. In the embodiment illustrated in FIG. 2, the image region 226 is generally elliptical in shape, though it will be appreciated that other shapes can also be used.

In a similar manner, the second projector 214 receives a second video image 228, which is represented in FIG. 2 as a series of vertical stripes. Before projection by the second projector, the signal of the second video image is processed to provide a mask that is different from that of the first projector 212. A second mask 230 is imposed upon the second video image that at least partially blocks or turns off an inner portion of the image producing a dark region (or region of attenuated brightness) 232 (which in this illustration is the same size and shape and in the same relative position as the image region of the first mask), while an outer portion 234 of the image is left unchanged.

With the second mask 230 imposed upon the second video image 228, the second projector 214 projects a second masked image 236, comprising the dark region 232 created by the second mask, and an outer image region 238 that is not blocked by the second mask. In the embodiment of FIG. 2, the first and second masked images are projected to a common projection location, and substantially completely overlap each other. The result is that the final projected image 216 comprises an inner image region 240 that is a portion of the first video image 218, and an outer image region 242 that is a portion of the second video image 228.

In the embodiment illustrated in FIG. 2, the image and dark regions of the first and second masks are the inverse of each other. That is, the first and second masks each have substantially the same size and shape, but places the image and dark regions in opposite portions. However, a given mask does not necessarily have to be the inverse of another, particularly where more than two projectors producing masks are involved. In such cases individual masks can have boundaries that do not coincide with any other particular mask, and masks can be configured to leave a portion of the screen black (unilluminated) and/or to allow illuminated portions of one or more component images to overlap each other, as is frequently done in multiple projector systems.

Figure 4:
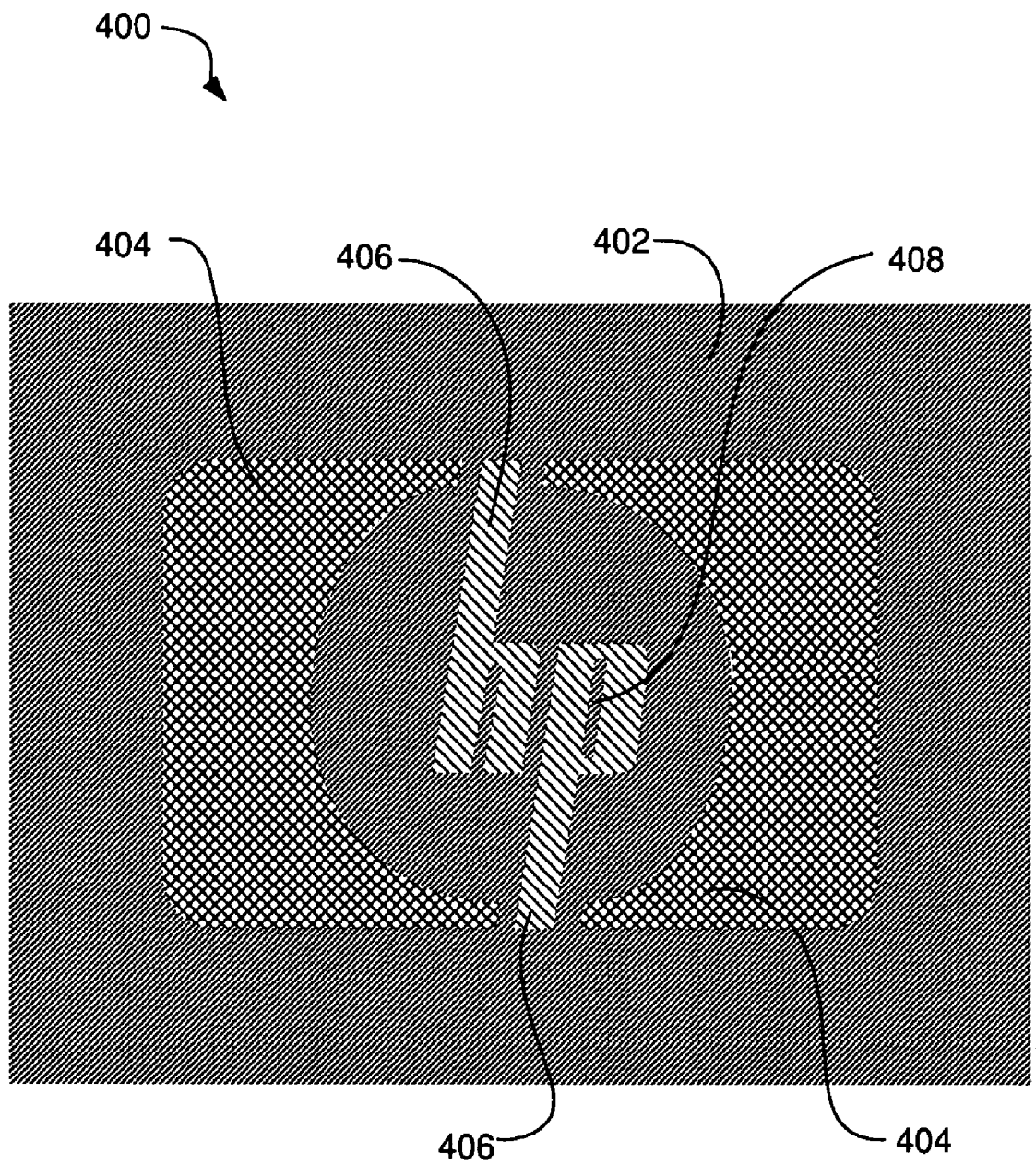
FIG. 4 is a view of one embodiment of a final display image that is a composite of several images that have been provided with various masks corresponding to an advertising logo.

Additionally, masks do not have to have single strict boundaries, but can be discontinuous. For example, a mask can have a hole or island region that is not connected to any other portion of the mask. A projected image 400 that can be produced using at least one discontinuous mask in a multiple projector system is shown in FIG. 4. In this logo image, the background image 402 is subject to one mask, while a first portion 404 of the logo is subject to another mask having two discontinuous portions. A second portion 406 of the logo is subject to yet another mask, which also includes two discontinuous portions (the letters "h" and "p"). Finally, another discontinuous mask region 408 allows the background image to show through the hole in the letter "p". It will be apparent that this is only one example of the many ways in which masking and overlaying of images can be used.

Figure 6:
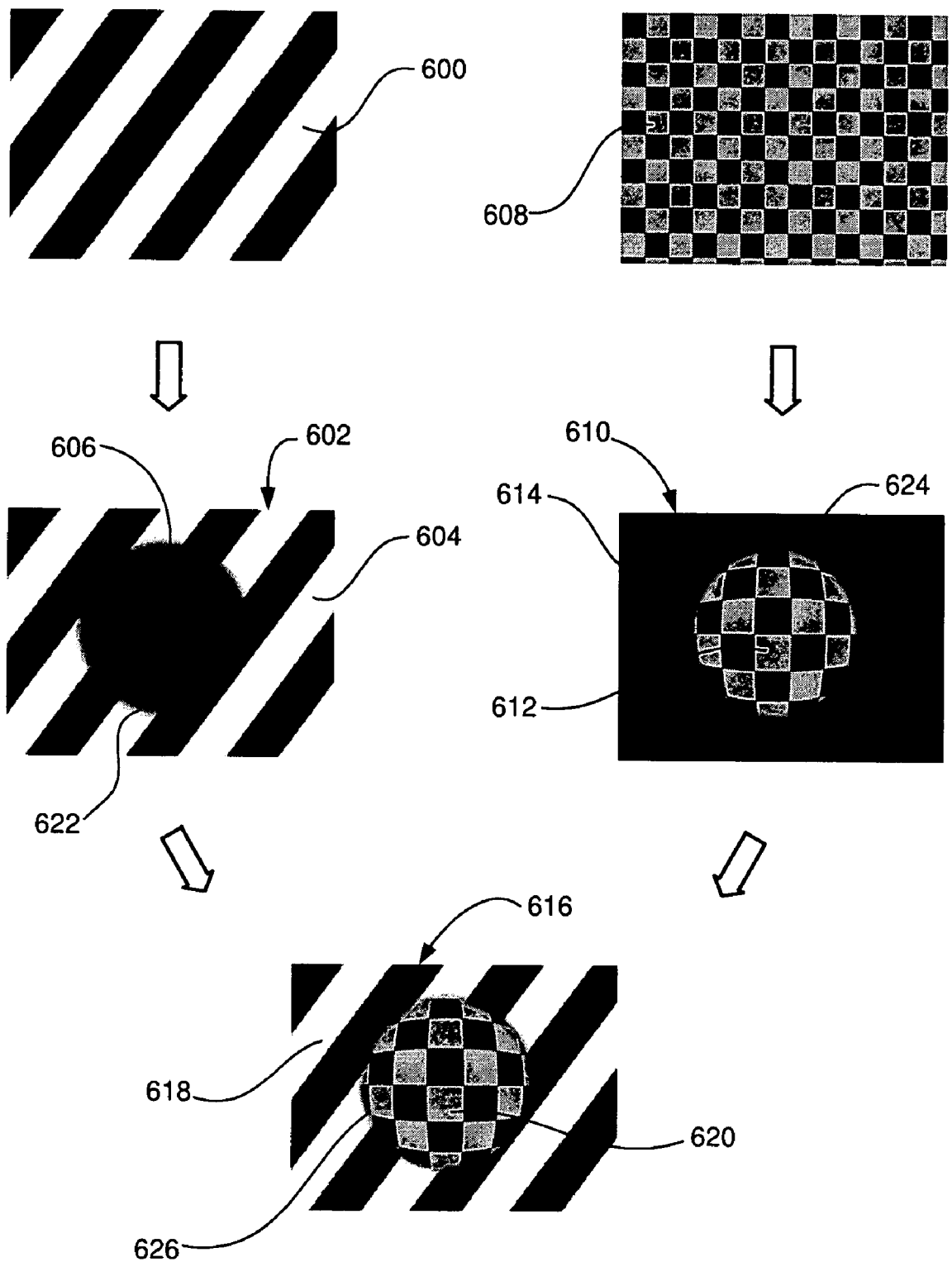
FIG. 6 shows one embodiment of input video images and masks involved in producing a final display image in which one component image has been geometrically warped.

The boundaries between the individual component images that are combined in the manner outlined herein do not have to be sharp, but can be fuzzy or blended to create different effects (e.g. feathered boundaries). For example, the boundaries of one or more masks can have their darkness attenuated at some gradual rate, so that one component image gradually blends into another across a mask boundary. In other words, the brightness attenuation adjacent to a mask boundary can vary from minimal attenuation at the boundary edge, to full attenuation (i.e. as full as desired) some distance away from the edge. An example of blended or feathered mask boundaries is shown in FIG. 6. In this figure the boundary 622 of the dark region 606 of the first mask 602 is not sharp, but gradually fades from the full brightness of the image region 604 to substantially full darkness toward the center of the dark region. Likewise, the mask boundary 624 in the second mask 610 gradually fades from full brightness toward the center of the image region 612 to substantially full darkness in the outer dark region 614. The result of blending these two images provides the composite image 616 that has a gradual or feathered boundary between the center portion 620 and the outer portion 618.

Masks can also be dynamic (i.e. changing over time) between projectors in a multi-projector system, so that mask shapes, types, and positions for each projector can change for different effects. For example, the two inverse elliptical mask shapes shown in FIG. 2 can each morph into different shapes over time, so that the "window" in the center of the composite image (providing a portion of the first video image 218) changes shape. Alternatively, one of the masks can gradually increase in its coverage of the final image, ultimately completely replacing the other. A wide variety of other changes are also possible.

Figure 3:
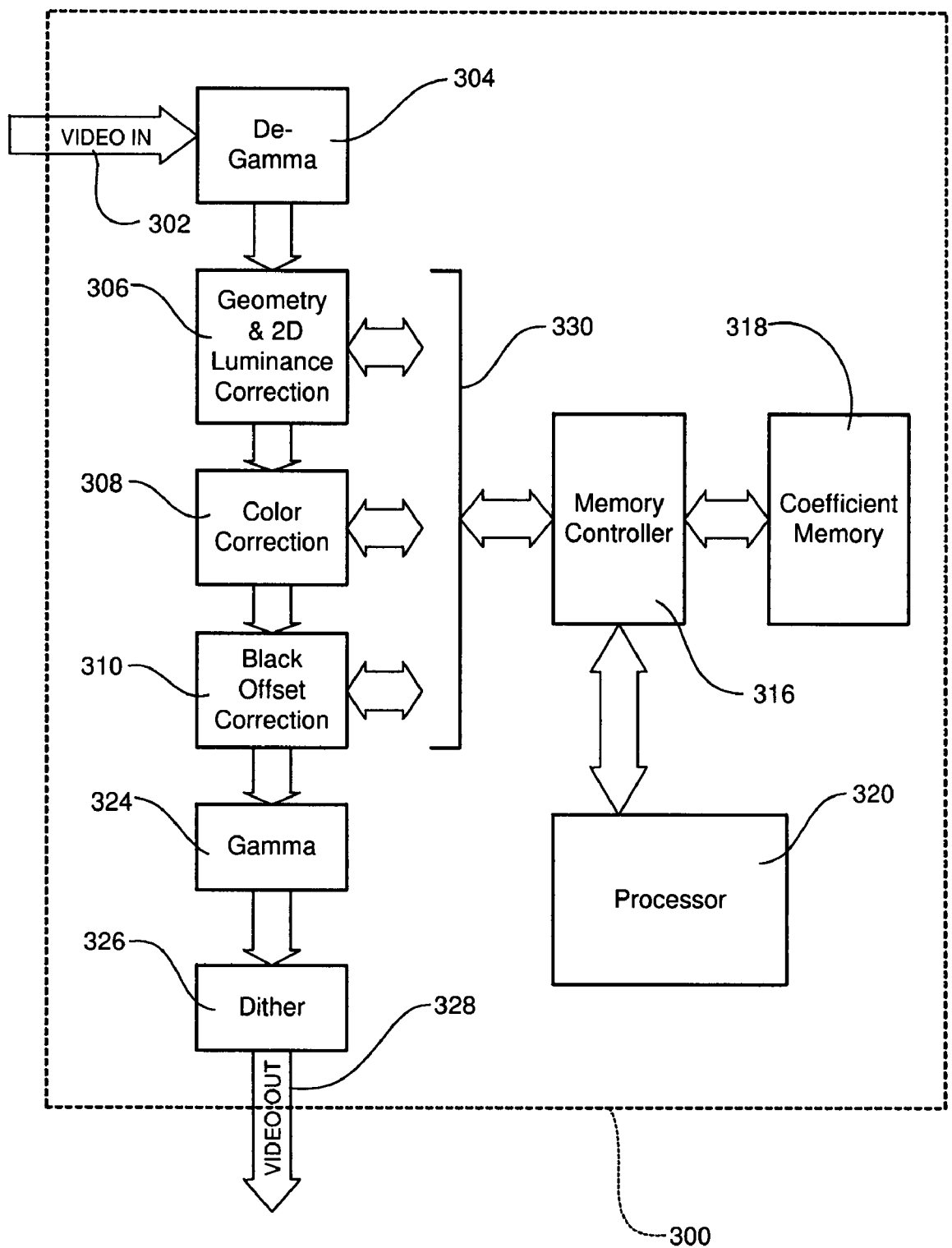
FIG. 3 is a block diagram of one embodiment of a signal processor of a projector, showing the steps performed in the image pipeline for a method for masking and overlaying images in a multiple projector system.

In accordance with the present disclosure, active masking in a multi-projector system can be achieved by changing the control parameters loaded in the image pipeline, as illustrated in FIG. 3. The steps outlined in this figure can be performed by the signal processor, represented by dashed line 300, of each projector in the multiple projector system. The process as outlined in this figure begins when the signal processor 300 receives a video signal, represented by arrow 302. Ordinarily, this incoming video signal will already have been subjected to gamma encoding, and thus can first have a de-gamma operation performed, as represented by block 304, to convert the signal into a form that can be easily digitally modified. Gamma encoding is well known, and is used to encode linear luminance or RGB values into video signals or digital file values. Gamma encoding helps to map data into a more perceptually uniform domain, so as to optimize perceptual performance of a limited signal range, such as a limited number of bits in each RGB component. The de-gamma operation reverses this correction to allow modification of the video signal.

Following the de-gamma operation, in a multi-projector system the signal is subjected to a series of correction steps, one or more of which can be involved in applying a desired mask. These correction steps include a geometry correction and luminance correction step (block 306). Using look-up table values stored in the coefficient memory 318 and provided by the memory controller 316, the geometry correction step applies coefficients to pixel location values (e.g. x, y coordinates) in the video input signal 302 to map those pixel locations to the desired projection location in the output signal 328. Geometric correction or warping of an input signal to an output signal is a common function in the signal processor for many projection systems, including in a multiple projector system. Keystone correction is one example of geometric correction that is performed this way.

The signal is also subjected to a 2D luminance correction (block 306), which adjusts the brightness of the image for the shape of the output. Where the geometry of an image signal has been warped for projection, the brightness may also become uneven. This step applies luminance coefficients (from the look-up table) to pixel luminance values to adjust the brightness of various pixels in order to achieve a desired brightness despite a geometric warp or other conditions. In a multiple projector system, this luminance correction can be part of an edge blending routine, for example, to allow multiple projected images to partially overlap, as depicted in FIGS. 1B and 1C.

The video signal can then be subject to a color correction step (block 308), which adjusts the colors that are output from the projector to align colors in a multiple projector system. Where multiple projectors are used to produce a single composite image, the colors projected by each projector based upon an identical color signal may vary slightly from each other simply due to manufacturing variations in the projectors. To compensate for this, the projectors in a multiple projector system can each be programmed with a color correction. This color correction step is normally programmed once for the particular projector, and ordinarily does not have to be changed over time.

Another step that is performed on the video signal is a black offset correction (block 310). It is recognized that when a digital projector projects a black image, the actual projected image is not completely black, but is instead a shade of grey. In a single projector system, this shade of grey will be substantially uniform, and generally does not need any black correction. However, in a multiple projector system with projected component images that overlap, black regions in an overlap area will be brighter than black regions in non-overlapping areas. Since changes in shades of grey are very noticeable to the human eye, the black offset correction is provided to boost the black point (i.e. make blacks darker) if possible in black overlap areas, and make the black shades less black in non-overlap areas, so that the shades appear uniform.

The correction steps 306-310 are indicated as a group by bracket 330 because one or more of these steps can be used to provide the masking function disclosed herein. These steps are all performed as directed by programming code associated with the memory controller 316, which is controlled by a processor 320, such as a microprocessor, and accesses geometry, luminance, color, and other correction information from look-up tables in the coefficient memory 318. Advantageously, this signal processor 300 can also be programmed with data regarding a mask that is to be applied to the video signal. This data can include the size, shape, location, edge characteristics, and any other relevant information for the mask, the parameters of which are applied during the various correction steps illustrated in FIG. 3.

During the performance of the steps within the bracket 330, masking can be applied and adjusted by the system in one or more of these steps. Program instructions for a given mask can be provided to the microprocessor 320, and act to modify the geometry, luminance, color correction and black offset coefficients in the look-up table stored in the coefficient memory. For example, in regions of the particular image where a given mask is to produce black output (e.g. the masked regions 222 and 232 in FIG. 2), the luminance correction (block 306) can multiply the luminance value for pixels in the masked area by a factor of 0, effectively turning those pixels off. Where the mask allows the image to fully show through, the luminance correction can be multiplied by a factor of 1, thus not changing the brightness of the output.

The luminance correction (block 306) can also be modified in other ways in connection with the masking process outlined herein. For example, if a feathered or blended mask edge is desired, the luminance modification factors for pixels in the feathered area can gradually vary from 1 to 0 across some distance. As another example, it can be desirable for a given mask to not completely block a portion of an image, but to provide a filter or similar effect. This can be done by having luminance modification factors between 0 and 1 applied to a window portion of a mask, so that the image that appears through the window is dimmed or de-emphasized. This approach can be taken where it is desired to enhance the appearance of other masked content that might appear over a given image. For example, a corporate logo or trademark can be superimposed over image content that is dimmed in order to emphasize the logo. Other variations are also possible.

The geometry correction step (block 306) can also be modified in the masking system. Where a mask provides certain boundaries, the geometry correction coefficients can be modified so that an image that is to show through those boundaries is geometrically modified for a desired effect. For example, using the elliptical mask example of FIG. 2, the geometry of the first image 218 that shows through the window area 226 of the first mask 220 can be modified so that the elliptical image 240 that appears in the final image has the appearance of the entire first image 218 projected onto the surface of a three dimensional ellipsoid. The geometry correction (block 306 in FIG. 3) can essentially "bend" the outer edges of the first image inwardly, so that an apparently curved image appears in the central window 240 of the final image 216.

One example of an approach for producing a final display image wherein the image region of one masked image includes a geometrically modified portion of a respective component image is shown in FIG. 6. In this figure, a first video image 600 is provided with a first mask 602 that includes an image region 604 and a dark or brightness attenuated region 606. A second video image 608 is similarly provided with a second mask 610 that includes an image region 612 and a dark or brightness attenuated region 614. However, in the process of applying the mask, the signal processor associated with the projector that projects the second masked video image has geometrically warped the second image, so that the image region 612 shows a warped version of the first video image. In this case, the first video image has been warped to give the appearance that the checkerboard pattern of the second video image is superimposed upon a sphere.

With this configuration, the outer portion 618 of the composite image 616 shows the un-masked portion of the first video image 600, and the inner portion 620 of the composite image shows the un-masked portion of the second video image 608. As noted above, this un-masked second video image portion has been warped so that it appears spherical in shape. Other geometric modifications can also be used. For example, the second image could be expanded, shrunk, or warped in other ways, such as to appear as though the image has been superimposed upon a surface with some other shape. These are just a few examples of geometric modifications that can be applied to a masked image in this way.

Mask-related modifications can also be applied in the color correction block 308. For example, it can be desirable to provide an overall color hue change to a portion of an image via the masking system for reasons such as those mentioned above with respect to the luminance correction. Specifically color coefficients can be applied to pixels appearing in a window portion of a mask, so that it appears that an image is being viewed through frosted glass, a colored filter, etc. Other color variations can also be applied.

Figure 5:
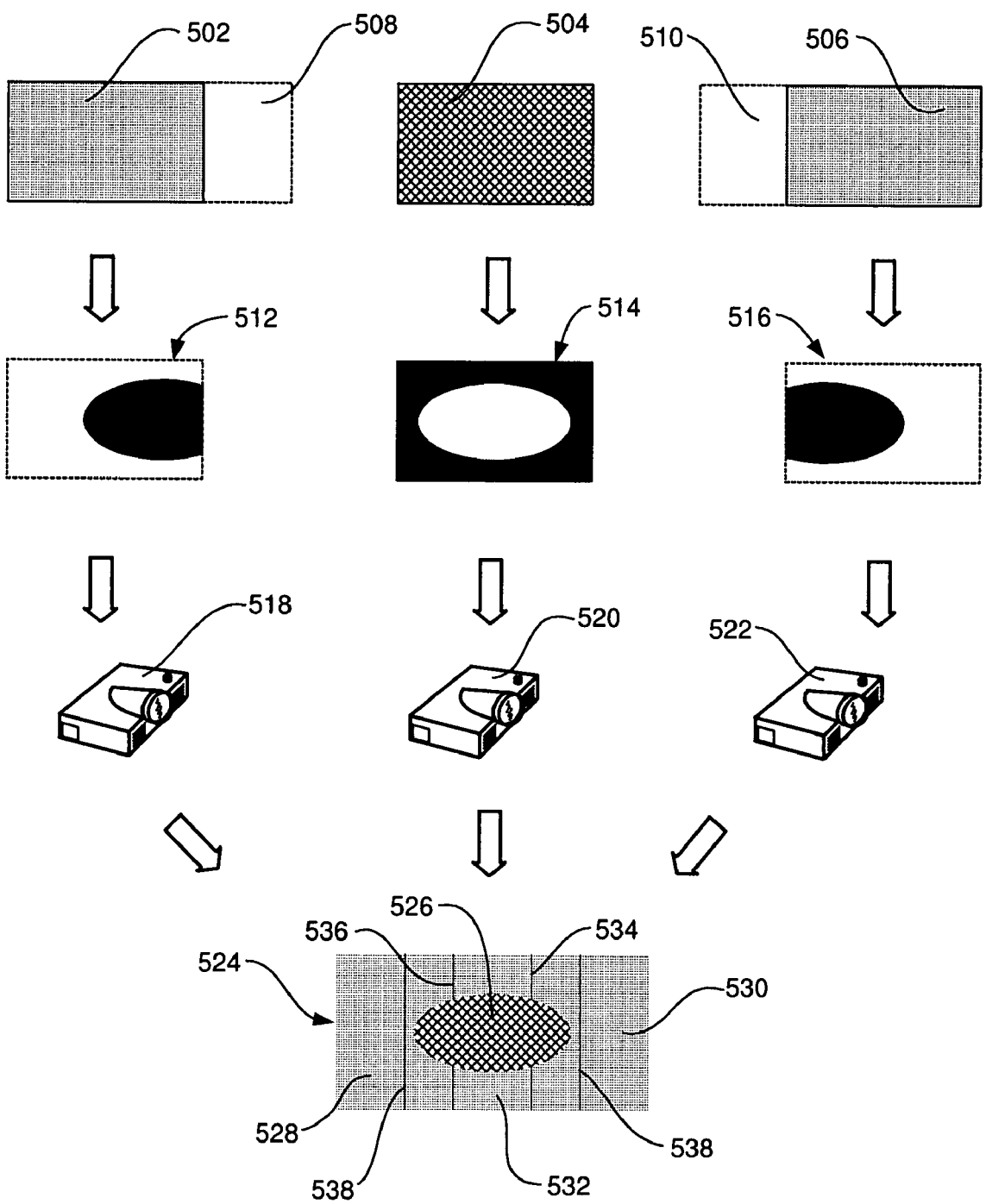
FIG. 5 is a conceptual diagram showing one embodiment of a system and method for masking and overlaying images in a multiple projector system having three projectors.

The black offset correction (block 310) can also be modified for a masking and overlaying system and method as disclosed herein. It can be desirable, for example, to provide a masked composite image in a multiple projector system where the component images do not completely overlap, such as shown in FIGS. 1B and 1C. In such a case, one or more masked regions of a given component image may overlap each other. This sort of situation is depicted in FIG. 5, in which three component images, 502, 504, 506 are masked and projected from three projectors 518, 520 and 522 to form a single composite image 524 that has a wider aspect ratio than any of the component images.

The first component image 502 and third component image 506 represent partially overlapping portions of a single wide aspect image. Each of these component images is truncated because of its narrower aspect ratio, as represented by the dashed line areas 508 and 510 which represent portions of the wide aspect image that are not projected by the respective projectors. The second component image 504 provides an image that is desired to appear in the center of the composite image 524.

To accomplish this combination, the first component image 502 is provided with a first mask 512 that blocks a partially elliptical region toward the right side of the mask. The third component image 506 is provided with a similar third mask 516 that blocks a partially elliptical region toward the left side of the mask. The second component image 504 is provided with a second mask 514 that blocks an outer region of the display with an elliptical hole in the middle.

These three masked images are projected to produce the final wide aspect composite image 524 with the second component image 504 appearing in an elliptical window 526 in the center overlap region 532 of the composite image. The right and left boundaries 534, 536 of the first and third masked component images, respectively, define the center overlap region 532, and are shown in this figure. The right and left boundaries 538 of the second masked component image are also shown. In this configuration, the image regions of the first and third masked images will overlap in the region 532, and hence will require a luminance correction. At the same time, the dark regions of these masked images will also partially overlap, and will require a black offset correction. Similarly, the dark region of the second masked component image partially overlaps both of the other component images, and may thus require a luminance correction in the non-overlapping portions of the first and third masked images to provide uniform brightness. All of these required changes to provide the desired composite image with masked component images can be performed by the correction steps outlined in blocks 306-310 in FIG. 3.

Referring back to FIG. 3, once the image correction steps are complete, gamma encoding 324 is again performed, followed by dithering 326 of the video image signal, if necessary. The gamma encoding may not be the inverse of the de-gamma operation 304 that was originally performed on the video signal, depending upon the characteristics of the video projector. The dithering step can be used to diffuse data error that may accumulate during the signal correction steps. After these final steps, the outgoing masked video signal 328 is ready for transmission to the projector.

Masking and overlaying images in a multi-projector system as described above can be performed statically as well as dynamically. That is, the signal processor 300 for each projector in a multiple projector system can be programmed with one mask configuration, and require some sort of operator intervention to change the mask. Alternatively, more than one mask configuration can be programmed into the system, and/or the mask configuration(s) can change shape, position, etc. over time. It will be appreciated that the ability of the system to apply dynamically changing mask configurations can depend upon the speed of the microprocessor 320 and its ability to recalculate and program new look-up tables into the coefficient memory 318. Nevertheless, the system and method disclosed herein allows both static and dynamic masking and overlaying of images in a multiple projector system.

The system thus provides video masking for multiple projectors, the masking being defined in the image pipeline at the projector end, rather than at the camera end. By adjusting the geometric and other calibration parameters for each projector pipeline channel in accordance with these steps, something similar to chroma keying can be created to overlay different video streams into a single projected image. This method allows for dynamic masking and for variably shaped boundaries. This method has the advantage that, if used in an advertising system, it can create dynamic and striking displays, such as by using an advertising logo to highlight specific content. Additionally, this method provides redundancy in the display, and creates variably shaped displays capable of being projected in any venue.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A method for masking images in a multi-projector system, comprising the steps of:
   a) converting, using signal processors associated with at least two digital projectors, at least two independent input video signals into at least two masked images, each masked image having an image region and a mask having substantially no brightness;

b) independently projecting the at least two masked images via the at least two digital projectors to a common location to form a composite image, such that the at least two masked images are at least partially superimposed, and wherein a mask of one masked image interfaces in the composite image with an image region of another masked image; and c) gradually attenuating brightness in a spatial manner adjacent to a boundary of a mask of at least one of the masked images.

2. A method in accordance with claim 1, further comprising the step of repeating steps (a) and (b) periodically over time, so as to dynamically mask the images.

3. A method in accordance with claim 1, further comprising the step of geometrically modifying a mask shape of at least one masked image.

4. A method in accordance with claim 1, further comprising the step of geometrically modifying at least one of the input video signals in a region corresponding to an image region of at least one masked image.

5. A method in accordance with claim 4, further comprising the step of geometrically warping at least one of the input video signals in a region corresponding to an image region of at least one masked image.

6. A method in accordance with claim 1, wherein the step of independently projecting the at least two masked images comprises projecting the at least two masked images so as to be substantially completely superimposed upon each other.

7. A method in accordance with claim 1, wherein the at least two masked images have inverse mask boundaries, and the step of independently projecting the at least two masked images comprises projecting the at least two masked images so as to be substantially completely superimposed upon each other.

8. A method in accordance with claim 1, wherein at least one masked image comprises a mask having a shape of a corporate logo.

9. A method in accordance with claim 1, wherein the at least two projectors comprise four projectors, and the at least two independent input video signals comprise four independent input video signals.

10. A multi-projector system for displaying a composite video image on a surface at a projection location, the multi-projector system comprising:

a first digital projector and associated signal processor, the signal processor configured to convert a first input video signal to a signal for a first masked video image, having an image region and a mask comprising substantially no brightness, and the first digital projector configured to project the first masked video image to a projection location; and a second digital projector and associated signal processor, the signal processor configured to convert a second input video signal to a signal for a second masked video image, having an image region and a mask, and the second digital projector configured to project the second masked video image to the projection location and at least partially superimposed upon the first masked video image, wherein the mask of the first masked image interfaces at the projection location with the image region of the second masked image, and wherein the signal processor associated with the first digital projector generates a region of gradually attenuated brightness in a spatial manner adjacent to a boundary of the mask in the first video image.

11. The multi-projector system in accordance with claim 10, wherein the first and second masked video images are substantially completely superimposed upon each other.

12. The multi-projector system in accordance with claim 10, wherein the first and second masked images have mask boundaries that are substantially the inverse of each other.

13. The multi-projector system in accordance with claim 12, wherein the image region of at least one of the first or second masked images is geometrically warped with respect to a corresponding input video image.

14. A non-transitory, computer-readable medium comprising machine readable program code, for causing a digital video projector and signal processor associated therewith, to perform the steps of:

a) converting an independent input video signal via the signal processor into an independent signal for a first masked image having an image region and a mask comprising substantially no brightness;

b) projecting the first masked image via the digital projector to a common projection location at which a second masked image having an image region and a mask comprising a region of attenuated brightness is projected, such that the first and second masked images are at least partially superimposed, wherein the mask of the first masked image interfaces at the common projection location with an image region of the second masked image; and c) attenuating brightness gradually in a spatial manner adjacent to a boundary of the mask of the first masked image.

15. A non-transitory, computer-readable medium in accordance with claim 14, further comprising program code for causing the signal processor to geometrically modify the input video signal.

16. A non-transitory, computer-readable medium in accordance with claim 14, further comprising program code for causing the signal processor and projector to repeat steps (a) and (b) periodically over time, so as to dynamically mask the first image.

17. A non-transitory, computer-readable medium in accordance with claim 14, further comprising program code for causing the signal processor to geometrically warp the independent signal in a region corresponding to an image region of the first masked image.

* * * * *